(12) United States Patent
Slutsky et al.

(10) Patent No.: US 9,946,907 B2
(45) Date of Patent: Apr. 17, 2018

(54) COMPACT IMAGING MODULE AND IMAGING READER FOR, AND METHOD OF, DETECTING OBJECTS ASSOCIATED WITH TARGETS TO BE READ BY IMAGE CAPTURE

(71) Applicant: SYMBOL TECHNOLOGIES, LLC, Lincolnshire, IL (US)

(72) Inventors: Michael S Slutsky, Stony Brook, NY (US); David P Goren, Smithtown, NY (US); Vladimir Gurevich, Great Neck, NY (US); William C Sackett, East Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/281,974

(22) Filed: May 20, 2014

(65) Prior Publication Data

US 2015/0339503 A1 Nov. 26, 2015

(51) Int. Cl.
*G06K 7/10* (2006.01)

(52) U.S. Cl.
CPC ..... *G06K 7/10732* (2013.01); *G06K 7/10752* (2013.01); *G06K 7/10792* (2013.01); *G06K 7/10861* (2013.01)

(58) Field of Classification Search
CPC ............ G06K 7/10722; G06K 9/00832; G06F 3/017; H04N 5/2354
USPC .................................................... 235/462.06
See application file for complete search history.

(56) References Cited

U.S. PATENT DOCUMENTS

| 6,914,526 | B2 | 7/2005 | Wallace et al. |
| 7,995,097 | B2 | 8/2011 | Tzur et al. |
| 8,004,575 | B2 | 8/2011 | Justiss et al. |
| 8,453,933 | B1 | 6/2013 | Pang |
| 8,622,305 | B2 | 1/2014 | Barkan |
| 8,630,478 | B2 | 1/2014 | Silver |

(Continued)

FOREIGN PATENT DOCUMENTS

| EP | 0424097 A1 | 4/1991 |
| EP | 0947942 A1 | 10/1999 |

(Continued)

OTHER PUBLICATIONS

International Search Report and Written Opinion dated Aug. 25, 2015 in counterpart PCT application PCT/US2015/030479.

*Primary Examiner* — Steve S Paik
*Assistant Examiner* — Tae Kim
(74) *Attorney, Agent, or Firm* — Yuri Astvatsaturov

(57) ABSTRACT

Objects associated with targets to be read by image capture are detected without any additional hardware in an imaging module. Return light is captured over a field of view of the module. Images are processed, during an object detection mode, to determine their image brightness from the captured return light. Illumination is emitted from an illumination light assembly at a first power level to determine a first image brightness from a first processed image, and at a different, reduced, second power level to determine a second image brightness from a second processed image. An object is determined to be in the field of view when a difference between the first image brightness and the second image brightness equals or exceeds a detection threshold value.

17 Claims, 7 Drawing Sheets

(56) References Cited

U.S. PATENT DOCUMENTS

| | | | |
|---|---|---|---|
| 2003/0007088 A1* | 1/2003 | Rantanen | H04N 5/2354 348/371 |
| 2004/0246354 A1* | 12/2004 | Yang et al. | 348/308 |
| 2009/0051933 A1* | 2/2009 | Stimpson et al. | 356/614 |
| 2010/0147952 A1* | 6/2010 | Carlson | 235/462.41 |
| 2012/0181338 A1* | 7/2012 | Gao | 235/455 |
| 2013/0016304 A1 | 1/2013 | Jo | |
| 2013/0182077 A1* | 7/2013 | Holz | 348/46 |

FOREIGN PATENT DOCUMENTS

| WO | 2006098955 A2 | 9/2006 |
|---|---|---|
| WO | 201036277 A1 | 4/2010 |

* cited by examiner

COMPACT IMAGING MODULE AND IMAGING READER FOR, AND METHOD OF, DETECTING OBJECTS ASSOCIATED WITH TARGETS TO BE READ BY IMAGE CAPTURE

BACKGROUND OF THE INVENTION

The present invention relates generally to an imaging module and an imaging reader for, and a method of, detecting objects associated with targets to be read by image capture.

Solid-state imaging systems or imaging readers have been used, in both handheld and/or hands-free modes of operation, to electro-optically read targets, such as one- and two-dimensional bar code symbol targets, and/or non-symbol targets, such as documents, over a range of working distances relative to each reader. An imaging reader includes a housing for supporting an imaging module, also known as a scan engine. In a hands-free mode, such as at a fixed position kiosk or at a stationary, point-of-sale (POS) workstation, the imaging module is mounted in a housing having at least one window to which objects associated with, e.g., bearing, the targets to be read are either presented, or across which the targets are swiped. The imaging module includes an imaging assembly having a solid-state imager or imaging sensor with an array of photocells or light sensors, which correspond to image elements or pixels in an imaging field of view of the imager, and an imaging lens assembly for capturing return light scattered and/or reflected from the target being imaged over a range of working distances relative to the module, and for projecting the return light onto the array to initiate capture of an image of the target. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the imaging field of view. In order to increase the amount of the return light captured by the array, for example, in dimly lit environments or for far-out targets located relatively far from the window, the imaging module generally also includes an illuminating light assembly for illuminating the target with illumination light over an illumination field for reflection and scattering from the target.

Some imaging modules continuously capture and attempt to process targets without regard to whether or not an object is actually in the imaging field of view. However, this consumes and wastes electrical energy and degrades module component lifetimes. To alleviate these problems, the art has proposed periodically and automatically activating, i.e., waking-up, the imaging module, for example, with a very low duty cycle (about 10%). Thus, the imaging module wakes up for a very short period of time to scan the imaging field of view and tries to detect a presence of an object therein. However, this creates sluggishness in the reader's performance and delays in processing, which can be perceived as an engineering defect, and also wastes electrical energy.

The art has also proposed the use of additional hardware components such as dedicated object sensors, each having an object detection field, which is at least partly commensurate with the imaging field of view, for activating the imaging module only if an object bearing a target is detected within the detection field. Such dedicated sensors may include motion sensors for detecting the movement of objects in the field of view by, for example, comparing the positions or locations of edges of captured images in the field of view between consecutive image frames. However, motion sensors can be falsely triggered, for example, by people or customers walking past the motion sensors, or by an operator's hands or body inadvertently passing through the field of view, or by objects not bearing targets entering the field of view. Such false triggering wastes electrical energy.

Such dedicated sensors may also include proximity sensors, typically one or more pairs of infra-red (IR) light emitters and detectors, each pair being operative for detecting a change or interruption in the IR light passing in a light path between the respective pair. In such IR light-based sensors, the range in which an object can be detected is dependent on the amount of IR light detected by each IR detector and, in turn, is dependent on the size and location of the object. A small object might not trigger the proximity sensor, thereby degrading reading performance. Typically, IR light-based sensors require optical alignment procedures to be performed, which increases manufacturing time and cost.

The deployment of dedicated object sensors generally undesirably increases the size, cost, electrical power consumption, and complexity of the imaging module, and, in turn, of the overall reader. The object detection field of an object sensor may not, in some cases, exactly match the imaging field of view of the module, thereby creating dead zones and compromise reading performance.

Accordingly, there is a need to reduce the size, cost, electrical power consumption, and complexity of the imaging module and of the overall reader, to efficiently and reliably effect object detection for objects, even of small size, without deploying additional hardware components or effecting optical alignment procedures, and to generally improve overall reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
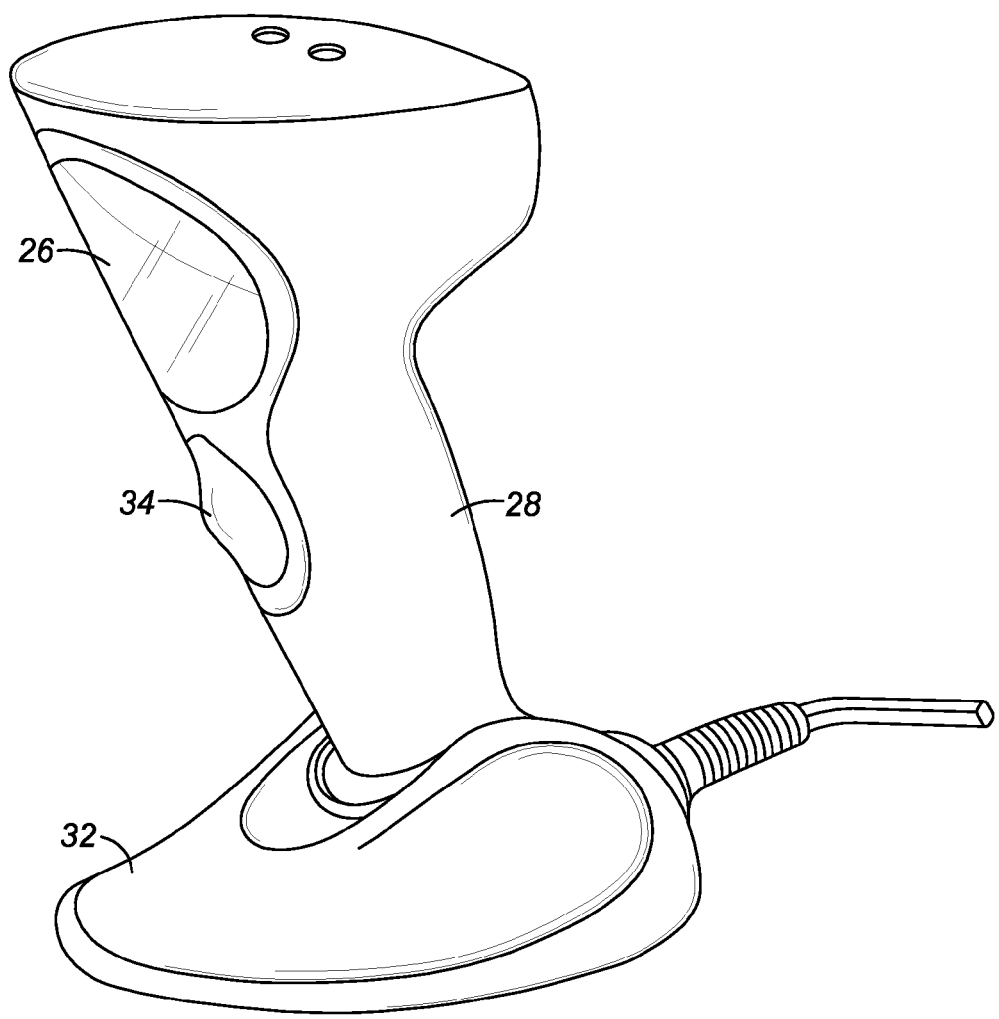
FIG. 1 is a perspective view of an imaging reader having an internal imaging module for detecting objects bearing targets to be read by image capture in accordance with the present invention.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module, also known as a scan engine, for detecting objects associated with targets to be read by image capture. Another aspect of the present disclosure relates to an imaging reader having a housing for supporting the imaging module. In both aspects, the imaging module comprises an imaging assembly including a solid-state imager having an array of image sensors, and an imaging lens assembly for capturing return light over a field of view, and for projecting the captured return light onto the array; and an energizable illuminating light assembly for emitting illumination light into the field of view when energized. The imaging module also comprises a controller or control circuit operative, during an object detection mode, for processing images to determine their image brightness from the captured return light. The controller also energizes the illuminating light assembly to emit illumination at a first power level to determine a first image brightness from a first processed image, energizes the illuminating light assembly to emit illumination at a different, second power level to determine a second image brightness from a second processed image, and determines that an object is located in the field of view when a difference between the first image brightness and the second image brightness has reached, e.g., equals or exceeds, a detection threshold value.

In one embodiment, the imager has a global shutter for simultaneously exposing all the image sensors in successive frames, in which case, the controller energizes the illuminating light assembly to emit the illumination at the first power level during one of the frames, and at the second power level during another of the frames. In another embodiment, the imager has a rolling shutter for sequentially exposing all the image sensors in successive rows or columns, in which case, the controller energizes the illuminating light assembly to emit the illumination at the first power level during exposure of a first plurality of the rows or columns, and at the second power level during exposure of a different, second plurality of the rows or columns.

Advantageously, the controller determines the image brightness by sorting light intensity values from the image sensors into a plurality of bins of a histogram, by assigning brightness scores for each bin, and by selecting the brightness score from the bin having the most light intensity values. In addition, the controller determines the detection threshold value during a calibration mode in which no object associated with a target is located in the field of view. The field of view may be subdivided into a plurality of subfields, in which case, the controller determines the detection threshold value for each subfield during the calibration mode.

Still another aspect of the present disclosure relates to a method of detecting objects associated with targets to be read by image capture. The method is performed by capturing return light over a field of view, by processing images, during an object detection mode, to determine their image brightness from the captured return light, by emitting illumination at a first power level to determine a first image brightness from a first processed image, by emitting illumination at a different, second power level to determine a second image brightness from a second processed image, and by determining that an object is located in the field of view when a difference between the first image brightness and the second image brightness has reached a detection threshold value.

Reference numeral 30 in FIG. 1 generally identifies an electro-optical reader for reading targets by image capture. The targets, such as one- and two-dimensional bar code symbol targets, are associated or applied either directly on objects or on their packaging, and are jointly movable with the objects. The targets may also be non-symbol targets or the objects themselves, such as documents, drivers' licenses, checks, shipping labels, etc. As illustrated, the reader 30 has a window 26 and a gun-shaped housing 28 supported by a base 32 for supporting the reader 30 on a support surface, such as a countertop. The reader 30 can thus be used in a hands-free mode as a stationary workstation in which objects or products bearing targets are slid, swiped past, or presented to, the window 26, or can be picked up off the countertop and held in an operator's hand and used in a handheld mode in which a trigger 34 is manually depressed to initiate reading of targets, especially one- or two-dimensional symbol targets, to be read. In another variation, the base 32 can be omitted, and housings of other shapes can be employed. The housing can also be permanently fixed to a stationary support. A cable, as illustrated in FIG. 1, connected to the base 32 can also be omitted, in which case, the reader 30 communicates with a remote host by a wireless transceiver, and the reader is electrically powered by an on-board battery.

Although FIG. 1 depicts a gun-shaped reader, this is merely exemplary, because it will be understood that many other reader configurations may be employed in the practice of this invention disclosed herein. For example, the reader 30 may alternatively be configured as a vertical slot scanner having a generally upright window, or as a horizontal slot scanner having a generally horizontal window, or as a bioptical workstation having both a generally horizontal window and a generally upright window. The reader may be used in many diverse environments.

Figure 2:
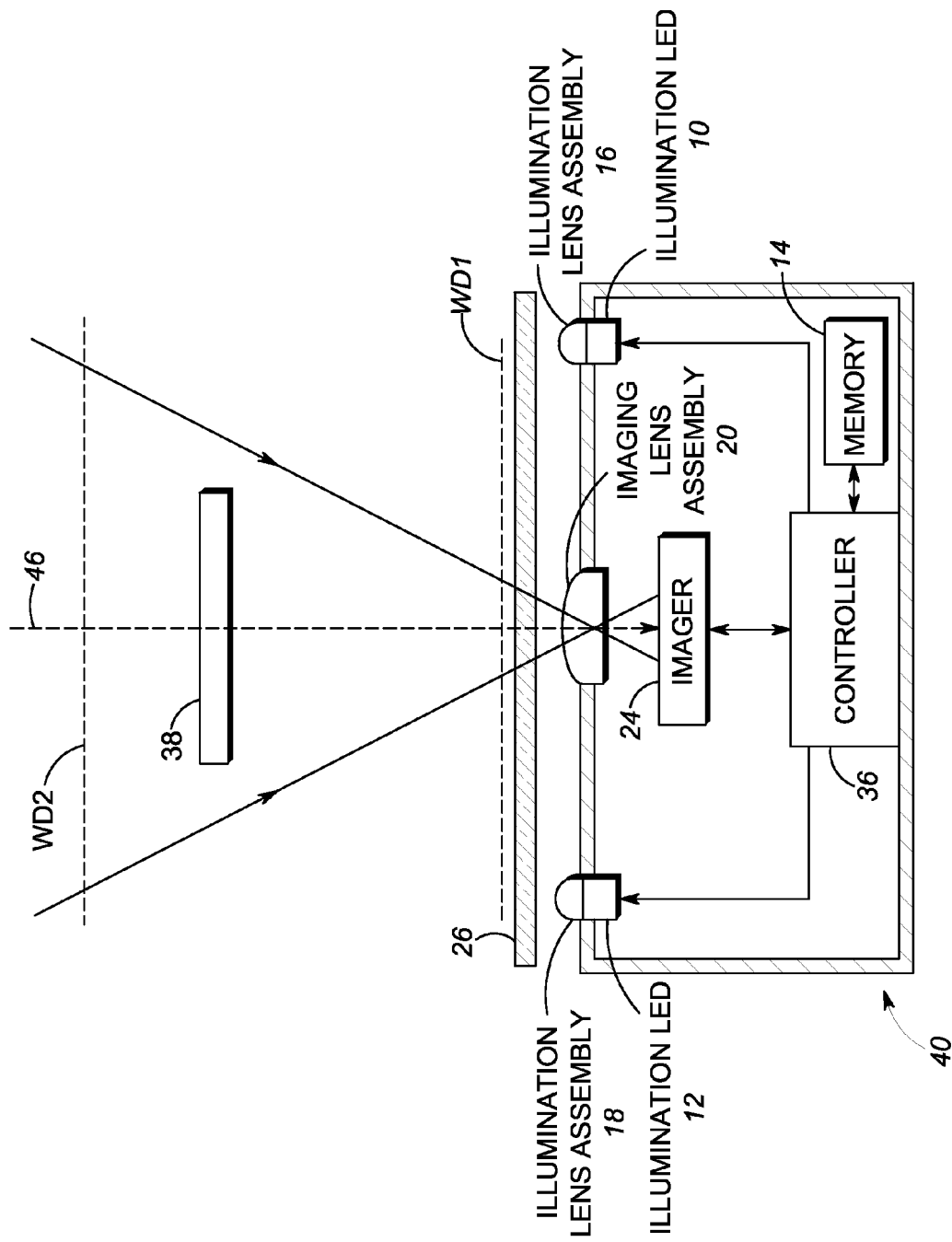
FIG. 2 is a schematic view of various components of the imaging module in the reader of FIG. 1.

FIG. 2 schematically depicts an imaging module or scan engine 40 mounted in the reader 30 behind the window 26. The imaging module 40 supports an imaging assembly that includes a solid-state, imager or image sensor 24, and an imaging lens assembly 20, which may have one or more imaging lenses, such as a Cooke triplet. The imager 24 has an array of pixels or light sensors and may be a one- or two-dimensional charge coupled device (CCD) or a complementary metal oxide semiconductor (CMOS) device, and is analogous to the imagers used in electronic digital cameras. The imager 24 and the lens assembly 20 are together operative for capturing return light scattered and/or reflected from an object 38 bearing a target to be read by image capture over a field of view along an optical path or axis 46 through the window 26 and over a range of working distances between a close-in working distance (WD1) and a far-out working distance (WD2). In a preferred embodiment, WD1 is about a half inch from the window 26, and WD2 can be many feet from the window 26, although other numerical values are contemplated. As described below, the imager 24 may have a global shutter in which all the image sensors are simultaneously exposed in successive frames, or a rolling shutter in which all the image sensors are sequentially exposed in successive rows or columns.

The imaging module 40 also supports an illuminating light assembly for illuminating the object 38 and the target with illumination light from an illumination light source. The illuminating light assembly includes, as illustrated, a pair of illumination light sources or light emitting diodes (LEDs) 10, 12, and a corresponding pair of illumination lens assemblies 16, 18 to uniformly illuminate the object 38 and the target with an illuminating light pattern. The imaging module 40 optionally supports a controller or control circuit 36 (see FIG. 4) for controlling operation of the electrical components supported by the imaging module 40, for processing the captured images, and for decoding the captured images when the targets are symbols. A memory 14 is connected and accessible to the controller 36.

Figure 3:
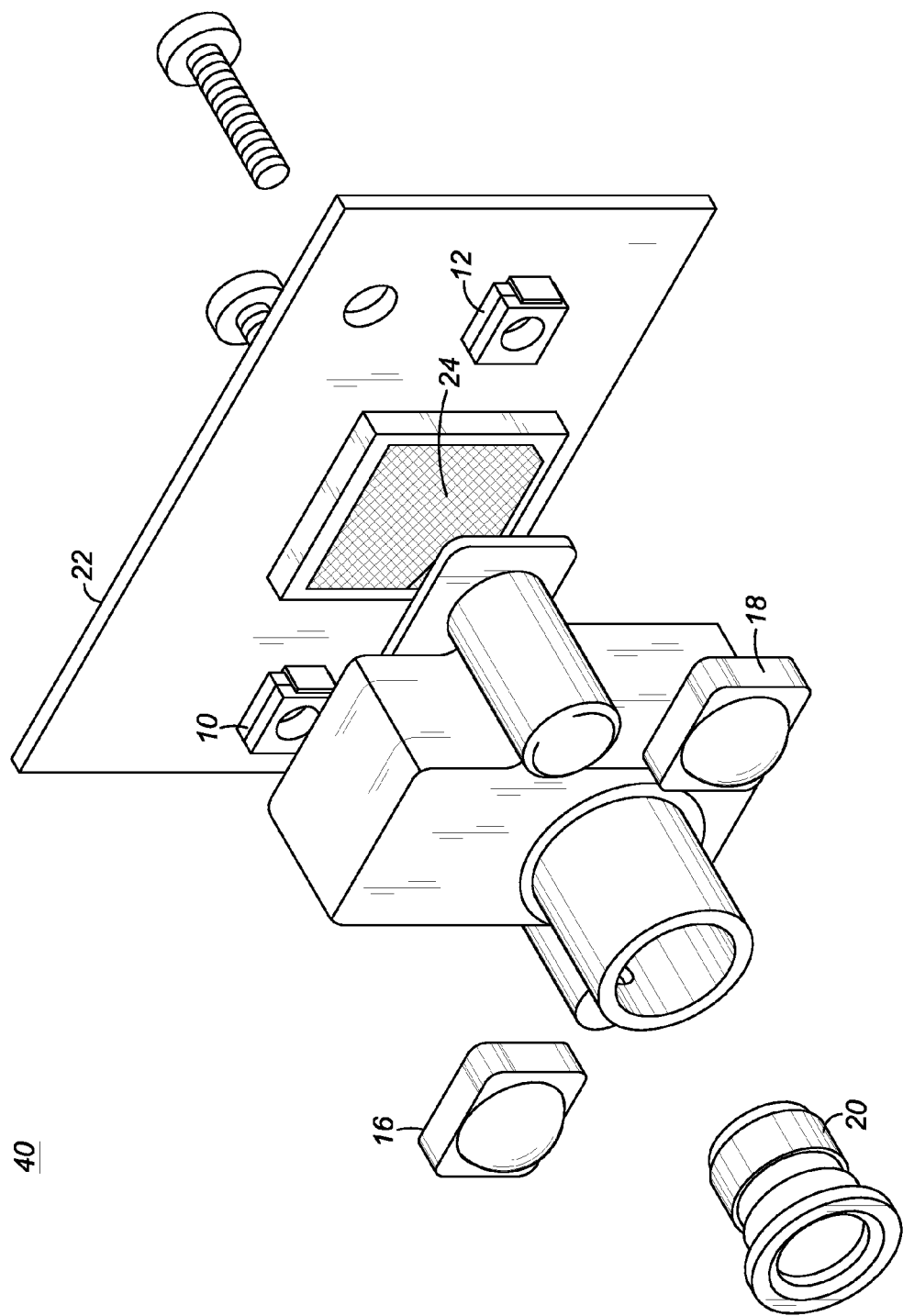
FIG. 3 is an exploded perspective view of some of the components of the imaging module of FIG. 2.

As best shown in FIG. 3, the pair of illumination LEDs 10, 12 are spaced apart from each other and surface-mounted on a printed circuit board (PCB) 22 in the module 40, and the pair of illuminating lens assemblies 16, 18 are mounted on the illumination LEDs 10, 12, for optically modifying the illumination light emitted from the illumination LEDs 10, 12. The illumination LEDs 10, 12 and the illuminating lenses 16, 18 are preferably symmetrically located at opposite sides of the imager 24, which is also surface-mounted on the PCB 22.

Figure 4:
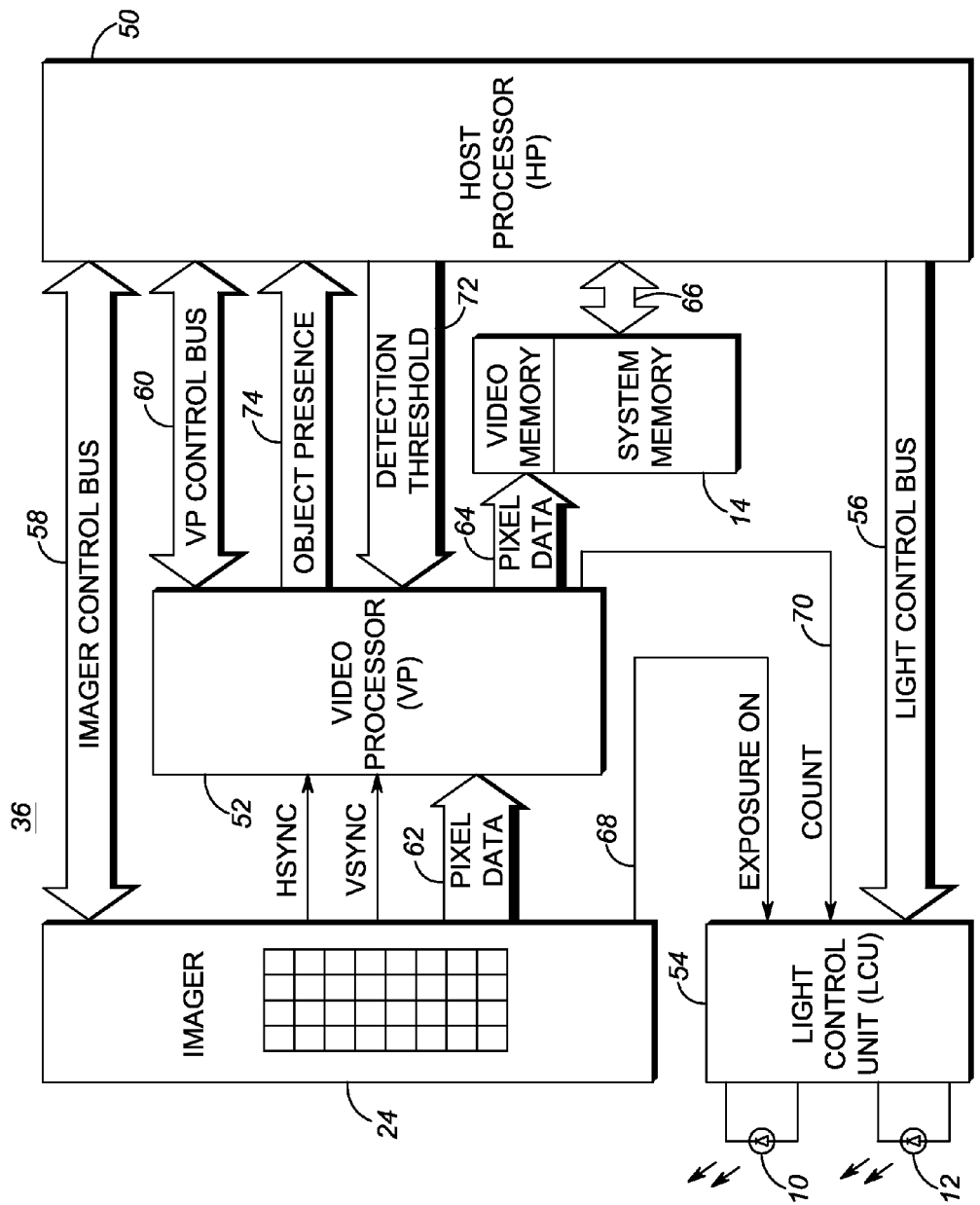
FIG. 4 is a block diagram depicting operation of some of the components of the imaging module of FIG. 2.

As best shown in FIG. 4, the controller or control circuit 36 includes a host processor (HP) 50, a video processor (VP) 52, and a light control unit (LCU) 54, all interconnected with the imager 24, the illumination LEDs 10, 12, and the memory 14. The HP 50 is a microprocessor for controlling the LCU 54 via a light control bus 56, for controlling the imager 24 via an imager control bus 58, and for controlling the VP 52 via a VP control bus 60. The HP 50 and the VP 52 may be combined in a single microprocessor. Image or pixel data, which is output from the imager 24, is sent to the VP 52 over a line 62; and image or pixel data, which is output from the VP 52, is sent to a video memory part of the memory 14 over a line 64. The other part of the memory 14 is system memory, which communicates with the HP 50 over line 66.

As previously mentioned, when the imager 24 uses a global shutter in which all the image sensors are simultaneously exposed in successive frames, then the control circuit 36 energizes the image sensor 24 during an exposure time period of a frame to collect light from the target during said time period. A typical array needs about 16-33 milliseconds to read the entire target image and operates at a frame rate of about 30-60 frames per second. A horizontal synchronization (HSYNCH) signal and a vertical synchronization (VSYNCH) signal, together with the pixel data, are output from the imager 24 to the VP 52. The imager 24 also signals the LCU 54 over line 68 to drive the illumination LEDs 10, 12 for a short time period in which the imager 24 is exposed, say an illumination pulse signal of about 500 microseconds.

Figure 5:
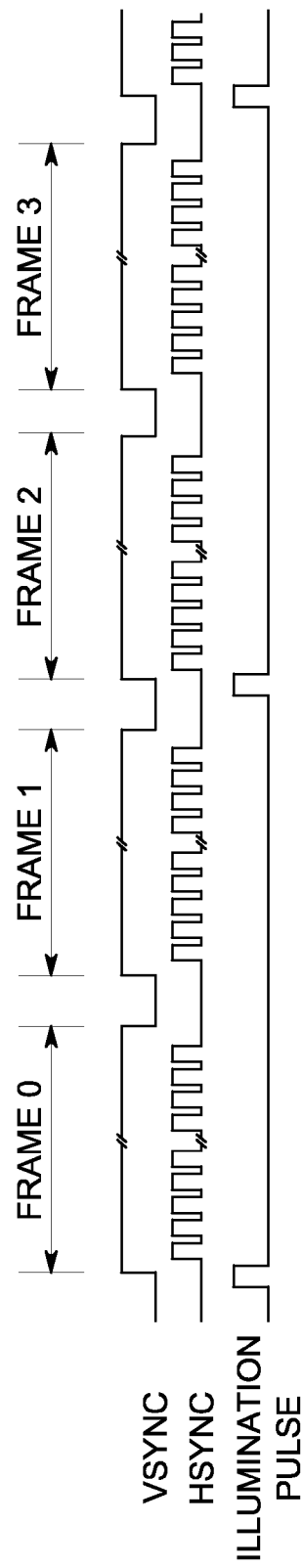
FIG. 5 is a timing diagram depicting operation during an object detection mode for an imager having a global shutter in accordance with one embodiment of this invention.

FIG. 5 depicts the timing among the VSYNCH signal, the HSYNCH signal, and the illumination pulse signal over successive frames. The illumination LEDs 10, 12 are turned on during the first frame (i.e., frame 0), then turned off during the second frame (i.e., frame 1), then turned on again during the third frame (i.e., frame 2), and then turned off again during the fourth frame (i.e., frame 3), and so on. Thus, the control circuit 36 is capable of enabling and disabling the illumination every other frame, or at least during different frames, for the purpose of object detection as described below. Rather than turning the illumination LEDs 10, 12 completely off, in an alternative variation, the control circuit 36 is instead capable of turning the illumination LEDs 10, 12 partially on, so that the power level of the emitted illumination during the odd-numbered frames is not zero, but merely reduced or lower in magnitude, as compared to the higher power level of the emitted illumination when the illumination LEDs 10, 12 are turned fully on during the even-numbered frames.

In accordance with this invention, it is desired to detect entry of the object 38 into the field of view without using any additional hardware components, such as motion or proximity sensors. This reduces the size, cost, energy consumption and complexity of the imaging module. To this end, the control circuit 36 is operative, during an object detection mode, for processing images to determine their image brightness from the captured return light, as described below. The control circuit 36 also energizes the illumination LEDs 10, 12, as described above, to emit illumination at a first power level (either full on, or partially on) to determine a first image brightness from a first processed image, and also energizes the illumination LEDs 10, 12, as also described above, to emit illumination at a different, reduced, second power level (either full off, or less partially on) to determine a second image brightness from a second processed image. The control circuit 36 determines that an object 38 is located in the field of view when a difference between the first image brightness and the second image brightness has reached, e.g., equals or exceeds, a detection threshold value. As described below, the detection threshold value is sent by the HP 50 to the VP 52 via the line 72. The VP 52 determines the brightness difference, compares the brightness difference against the detection threshold value received from the HP 50, and outputs an object presence signal to the HP 50 via the line 74.

If the object 38 is at the far end of the working distance range, then the image brightness with or without the illumination would be roughly the same and mostly defined by the brightness of the ambient light. As the object 38 moves closer and approaches the window 26, the image brightness with the illumination on will exceed the image brightness with the illumination off due to the object reflecting illumination light back to the imager. As a result, the image brightness with the illumination on will exceed the image brightness with the illumination off, and the difference in the image brightness with or without the illumination increases as the object 38 is located closer to the window 26. When this difference reaches the aforementioned detection threshold value set by the HP 50 on line 72, then an object 38 is declared to be present in the field of view, after which the reader can transition from the object detection mode to a reading mode in which the target is read.

Figure 6:
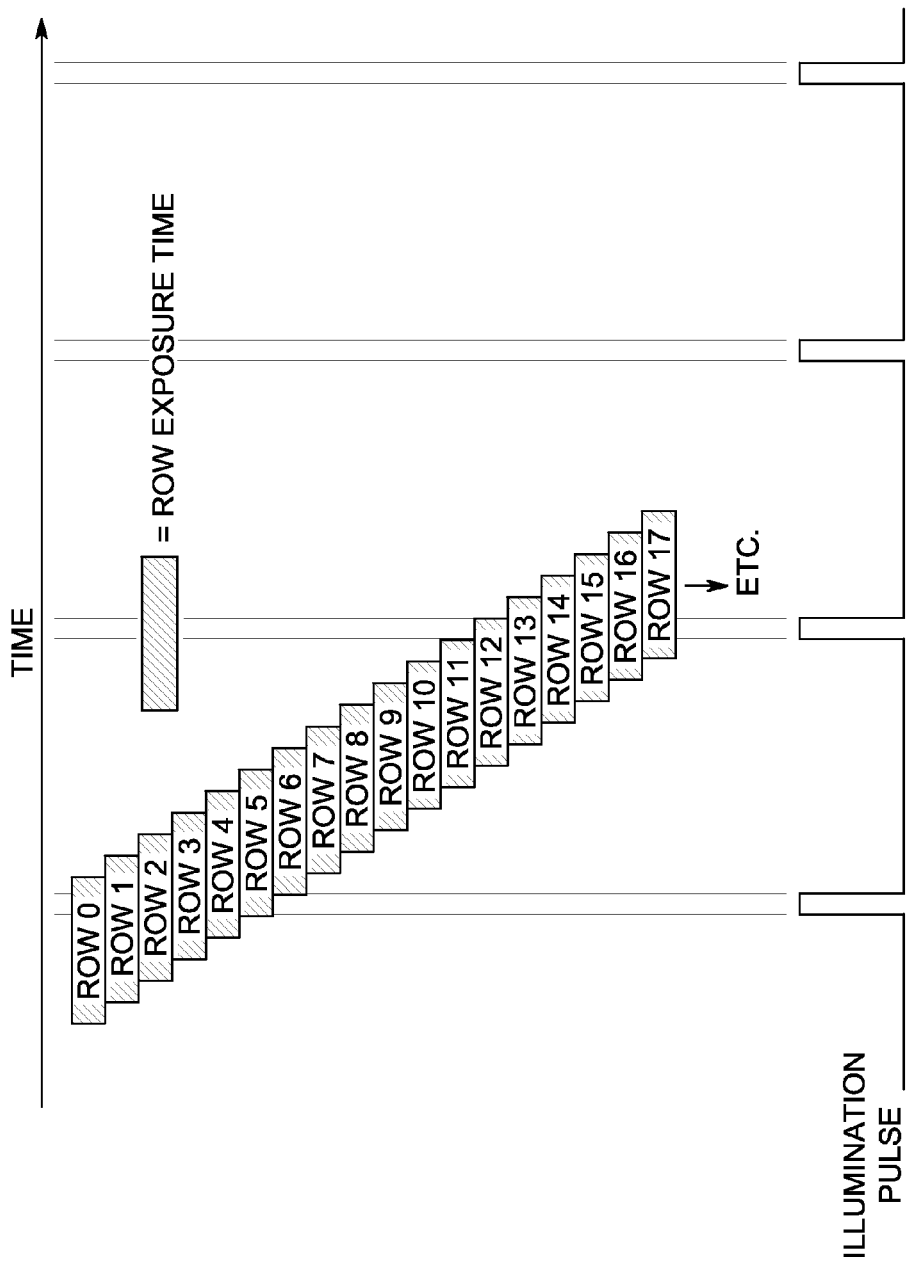
FIG. 6 is a timing diagram depicting operation during an object detection mode for an imager having a rolling shutter in accordance with another embodiment of this invention.

As previously mentioned, when the imager 24 uses a rolling shutter in which the image sensors, which are arranged in mutually orthogonal rows and columns, are sequentially exposed in successive rows or columns, then the control circuit 36 energizes the illumination LEDs 10, 12, as described above, to emit the illumination at the first power level during exposure of a first plurality of the rows (or columns), e.g., rows 0-5 in FIG. 6, and at the reduced, second power level during exposure of a second plurality of the rows (or columns), e.g., rows 6-10 in FIG. 6. Thus, the illumination pulses in FIG. 6 are synchronized with certain pluralities of rows (or columns). There will be several illumination pulses within each frame, so that some rows (or columns) with the illumination on will alternate with some other rows (or columns) with the illumination off.

As before, the control circuit 36 determines a first image brightness from a first processed image for the rows (or columns) with the illumination on, and also determines a second image brightness for the rows (or columns) with the illumination off The control circuit 36 determines that an object 38 is located in the field of view when a difference between the first image brightness and the second image brightness has reached, e.g., equals or exceeds, a detection threshold value. As described below, the detection threshold value is sent by the HP 50 to the VP 52 via the line 72. The VP 52 determines the brightness difference, keeps track of the row (or column) count on line 70, compares the brightness difference against the detection threshold value received from the HP 50, and outputs an object presence signal to the HP 50 via the line 74.

The control circuit 36 can determine the image brightness in various ways. Advantageously, the control circuit 36 sorts light intensity values from the image sensors into a plurality of bins of a histogram, assigns brightness scores for each bin, and selects the brightness score from the bin having the most light intensity values. In addition, the control circuit 36 determines the detection threshold value during a calibration mode in which no object 38 associated with a target is located in the field of view. More particularly, the control circuit 36 is operative, during the calibration mode, for energizing the illumination LEDs 10, 12 to emit illumination at a first power level to determine a first image brightness from a first processed image of the field of view, for energizing the illumination LEDs 10, 12 to emit illumination at a different, reduced, second power level to determine a second image brightness from a second processed image of the field of view, and for setting the detection threshold value based on a difference between the first image brightness and the second image brightness of the field of view. During the calibration mode, the control circuit 36 is determining the brightness of the background, i.e., with no object 38 therein.

For improved accuracy, the background or the field of view may be subdivided into a plurality of regions or subfields, in which case, the control circuit 36 determines the detection threshold value for each subfield during the calibration mode. By way of example, the field of view may be divided into sixteen regions, and the brightness of each region may be separately determined. Each region will have its own detection threshold value. The presence of an object will be detected if any one of the regions has a differential brightness higher than that of the detection threshold value for that region. This division of the field of view into multiple regions is of especial benefit when a relatively big, bright stationary object in the background masks the presence of a smaller object bearing a small symbol target. For example, an operator of the reader may pile up many objects on a countertop close to the window 26, in which case, another object might not be so readily detected. Thus, even if those larger, bright objects mask some regions, not all the regions will be masked, thereby allowing the smaller object to be detected.

Figure 7:
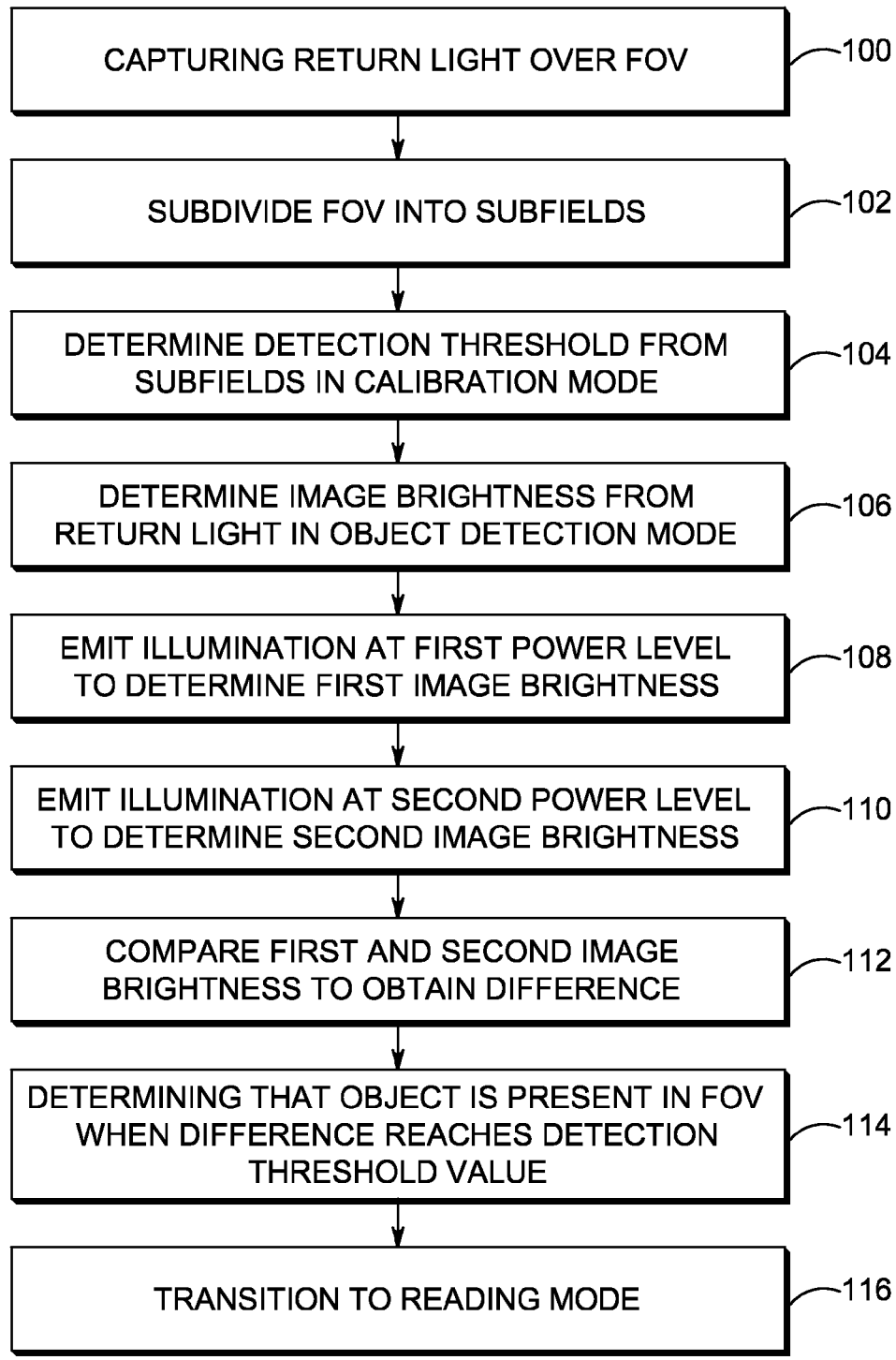
FIG. 7 is a flow chart depicting steps performed in a method of detecting objects bearing targets to be read by image capture in accordance with the present invention.

Turning now to the flow chart of FIG. 7, a method of detecting objects 38 associated with targets to be read by image capture, is performed by initially determining the detection threshold value in a calibration mode. In step 100, return light is captured by the imaging assembly over a field of view; and, in step 102, the field of view is subdivided into a plurality of subfields, for example, by assigning different regions, i.e., rows and columns, in the imager array to the different subfields. In step 104, for each subfield, the image brightness with the illumination on is compared to the image brightness with the illumination off, and this brightness differential is indicative of the background brightness. A brightness score can be assigned to this brightness differential, especially if the differential is small or very close to zero.

The imaging module then transitions into an object detection mode, in which the module determines if an object 38 has entered the field of view. In step 106, the image brightness is determined with the illumination on (step 108), and the image brightness is determined with the illumination off (step 110). In step 112, these two image brightnesses are compared to obtain a brightness differential indicative of the image brightness of the object. In step 114, when this brightness differential equals or exceeds the detection threshold value, then the module knows that an object 38 is indeed present in the field of view. The imaging module then transitions into a reading mode in step 116.

For faster object detection, a higher frame rate may be employed. In a preferred embodiment, the array may measure 1280×960 in resolution and size, and the nominal frame rate during the reading mode may be 60 Hz. To achieve a higher frame rate, the array may be sub-sampled. For example, the frame sub-sampling may be done by programming the imager 24 to output every sixteenth pixel line, instead of every line; hence, the sub-sampled image will only have 960/16=60 lines, and a smaller resolution, e.g., 1280×60, and this sub-sampled frame can be sent out in a much shorter time, thereby achieving an elevated frame rate upwards of 500 Hz. The elevated frame rate allows a smaller detection latency (the time between an object 38 entering the field of view and the moment of object detection), which is very important for swipe symbol target reading applications. The transition in and out of sub-sampled operation is controlled by the VP 52. Once the object 38 is detected, the VP 52 commands the imager 24 to switch back to the full 1280×960 resolution.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:
1. An imaging module for detecting objects associated with targets to be read by image capture, comprising:
an imaging assembly including a solid-state imager having an array of image sensors arranged in rows and columns, and an imaging lens assembly configured to capture return light over a field of view and project the return light onto the array;
a rolling shutter configured to sequentially expose the image sensors in successive rows or successive columns over a single frame;
an illuminating light assembly configured to emit illumination light into the field of view when energized and in pulses shorter than the single frame; and
a controller configured to:
during an object detection mode of the imaging module and within the single frame:
operate the illuminating light assembly to emit the illumination light at a first power level during exposure of a first subset of the rows or the columns, using the rolling shutter, to determine a first image brightness;
operate the illuminating light assembly to emit the illumination light at a second power level different from the first power level during exposure of a second subset of the rows or the columns, using the rolling shutter, to determine a second image brightness, the exposure of the second subset of the rows or the columns following the exposure of the first subset of the rows or the columns within the single frame; and
when a difference between the first image brightness and the second image brightness has reached a detection threshold value, transition the imaging module to an object reading mode; and
during the object reading mode of the image module:
control the imaging module to illuminate the field of view with an illuminating light;
capture an image of a barcode symbol with the solid-state imager; and
decode the image to obtain coded information from the barcode symbol.

2. The imaging module of claim 1, wherein the controller configured to operate the illuminating light assembly to emit the illumination light at the second power level includes the controller configured to operate the illuminating light assembly such that the illuminating light assembly is turned off.

3. The imaging module of claim 1, wherein the controller is configured to determine image brightness by sorting light intensity values from the image sensors into a plurality of bins of a histogram, by assigning brightness scores for each bin, and by selecting a brightness score from the bin having most of the light intensity values.

4. The imaging module of claim 1, wherein the controller is configured to:
determine the detection threshold value during a calibration mode in which no object associated with a target is located in the field of view; and during the calibration mode,
operate the illuminating light assembly to emit the illumination light at the first power level to determine a first calibration image brightness;
operate the illuminating light assembly to emit the illumination light at the second power level to determine a second calibration image brightness; and
set the detection threshold value based on a difference between the first calibration image brightness and the second calibration image brightness.

5. The imaging module of claim 4, wherein the controller is configured to:

control the imaging assembly to subdivide the field of view into a plurality of subfields; and
determine a respective detection threshold value for each of the subfields during the calibration mode.

6. The imaging module of claim 1, wherein the controller is configured to:
in the object reading mode, control the imaging assembly to output a first respective image of a target from all of the array at a first frame rate; and
in the object detection mode, sub-sample the array to output a second respective image at a second frame rate higher than the first frame rate.

7. An imaging reader, comprising:
a housing; and
an imaging module supported by the housing and configured to detect objects associated with targets to be read by image capture, the image module including:
an imaging assembly including a solid-state imager having an array of image sensors arranged in rows and columns, and an imaging lens assembly configured to capture return light over a field of view and project the captured return light onto the array;
a rolling shutter configured to sequentially expose the image sensors in successive rows or successive columns over a single frame;
an illuminating light assembly configured to emit illumination light into the field of view when energized and in pulses shorter than the single frame; and
a controller configured to:
during an object detection mode of the image module and within the single frame:
operate the illuminating light assembly to emit the illumination light at a first power level during exposure of a first subset of the rows or the columns, using the rolling shutter, to determine a first image brightness;
operate the illuminating light assembly to emit the illumination light at a second power level different from the first power level during exposure of a second subset of the rows or the columns, using the rolling shutter, to determine a second image brightness, the exposure of the second subset of the rows or the columns following the exposure of the first subset of the rows or the columns within the single frame; and
when a difference between the first image brightness and the second image brightness has reached a detection threshold value, transition the imaging module to an object reading mode; and during the object reading mode of the imaging module:
control the imaging module to illuminate the field of view with an illuminating light;
capture an image of a barcode symbol with the solid-state imager; and
decode the image to obtain coded information from the barcode symbol.

8. The imaging reader of claim 7, wherein the controller configured to operate the illuminating light assembly to emit the illumination light at the second power level includes the controller configured to operate the illuminating light assembly such that the illuminating light assembly is turned off.

9. The imaging reader of claim 7, wherein the controller is configured to determine image brightness by sorting light intensity values from the image sensors into a plurality of bins of a histogram, by assigning brightness scores for each bin, and by selecting a brightness score from the bin having most of the light intensity values.

10. The imaging reader of claim 7, wherein the controller is configured to:
determine the detection threshold value during a calibration mode in which no object associated with a target is located in the field of view; and during the calibration mode,
operate the illuminating light assembly to emit the illumination light at the first power level to determine a first calibration image brightness;
operate the illuminating light assembly to emit the illumination light at the second power level to determine a second calibration image brightness; and
set the detection threshold value based on a difference between the first calibration image brightness and the second calibration image brightness.

11. The imaging reader of claim 10, wherein the controller is configured to:
control the imaging assembly to subdivide the field of view into a plurality of subfields; and
determine a respective detection threshold value for each of the subfields during the calibration mode.

12. The imaging reader of claim 7, wherein the controller is configured to:
in the object reading mode, control the imaging assembly to output a first respective image of a target from all of the array at a first frame rate; and
in the object detection mode, sub-sample the array to output a second respective image at a second frame rate higher than the first frame rate.

13. A method of detecting objects associated with targets to be read by image capture, comprising:
operating an illuminating light assembly to emit the illumination light at a first power level during exposure of a first subset of rows or columns of an array of image sensors, using a rolling shutter configured to sequentially expose the image sensors in successive rows or successive columns over a single frame, to determine a first image brightness;
operating the illuminating light assembly to emit the illumination light at a second power level different from the first power level during exposure of a second subset of the rows or the columns, using the rolling shutter, to determine a second image brightness the exposure of the second subset of the rows or the columns following the exposure of the first subset of the rows or the columns within a single frame, wherein illumination light emitted during the operation of the illuminating light assembly to emit the illumination light at least one of the first power level and the second power level is in pulses shorter than the single frame; and
when a difference between the first image brightness and the second image brightness has reached a detection threshold value, transitioning the imaging module to an object reading mode; and during the object reading mode:
controlling the imaging module to illuminate a field of view with an illuminating light;
capturing an image of a barcode symbol with a solid-state imager; and
decoding the image captured to obtain coded information from the barcode symbol.

14. The method of claim 13, further comprising:
determining the detection threshold value during a calibration mode in which no object associated with a target is located in the field of view; and during the calibration mode:
   operating the illuminating light assembly to emit the illumination light at the first power level to determine a first calibration image brightness;
   operating the illuminating light assembly to emit the illumination light at the second power level to determine a second calibration image brightness; and
   setting the detection threshold value based on a difference between the first calibration image brightness and the second calibration image brightness.

15. The method of claim 14, further comprising:
subdividing the field of view into a plurality of subfields; and
determining of a respective detection threshold value for each subfield during the calibration mode.

16. The method of claim 13, further comprising:
in the object reading mode, controlling the imaging assembly to output a first respective image of a target from all of the array at a first frame rate; and
in the object detection mode, sub-sampling the array to output a second respective image at a second frame rate higher than the first frame rate.

17. The method of claim 13, wherein the operating the illuminating light assembly to emit the illumination light at the second power level includes operating the illuminating light assembly such that the illuminating light assembly is turned off.

* * * * *